(12) United States Patent
Timofeev et al.

(10) Patent No.: US 9,413,574 B1
(45) Date of Patent: Aug. 9, 2016

(54) SYSTEMS AND METHODS FOR DC OFFSET CORRECTION

(71) Applicant: Marvell International Ltd., Hamilton (BM)

(72) Inventors: Sergey Timofeev, Santa Clara, CA (US);
Swaroop Venkatesh, Dublin, CA (US);
Atul Salhotra, Santa Clara, CA (US);
Rohit U. Nabar, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 19 days.

(21) Appl. No.: 13/955,330

(22) Filed: Jul. 31, 2013

Related U.S. Application Data

(60) Provisional application No. 61/678,530, filed on Aug. 1, 2012.

(51) Int. Cl.
| | |
|---|---|
| *H03D 1/04* | (2006.01) |
| *H03D 1/06* | (2006.01) |
| *H03K 5/01* | (2006.01) |
| *H03K 6/04* | (2006.01) |
| *H04B 1/10* | (2006.01) |
| *H04L 1/00* | (2006.01) |
| *H04L 25/08* | (2006.01) |
| *H04L 27/01* | (2006.01) |

(52) U.S. Cl.
CPC .................................. *H04L 27/01* (2013.01)

(58) Field of Classification Search
CPC ............ H04L 27/06; H04L 25/03343; H04W 72/042; H04B 7/086
USPC ............ 375/360, 1, 232, 329, 203, 260, 346; 455/324, 323
See application file for complete search history.

(56) References Cited

U.S. PATENT DOCUMENTS

| | | | | |
|---|---|---|---|---|
| 4,764,748 | A * | 8/1988 | Geen | H04J 3/10 341/131 |
| 7,349,469 | B1 * | 3/2008 | Touzni | H04L 25/03063 375/232 |
| 8,218,686 | B1 | 7/2012 | Timofeev et al. | |
| 2003/0058961 | A1 * | 3/2003 | Fling | G01V 3/08 375/316 |
| 2003/0152021 | A1 * | 8/2003 | Wang | H04L 25/0204 370/208 |
| 2005/0047526 | A1 * | 3/2005 | Watanabe et al. | 375/316 |
| 2008/0089443 | A1 * | 4/2008 | Sanada | H04L 27/2675 375/319 |
| 2010/0074078 | A1 * | 3/2010 | Cao | G11B 5/5565 369/53.17 |

OTHER PUBLICATIONS

Huang, Defeng (David), et al., Carrier Frequency Offset Estimation for OFDM Systems Using Null Subcarriers, IEEE Transactions on Communications, vol. 54, No. 5, May 2006, pp. 813-823.

* cited by examiner

*Primary Examiner* — Chieh M Fan
*Assistant Examiner* — Wednel Cadeau

(57) ABSTRACT

Systems and methods for removing DC offset from a signal are provided. A radio frequency signal is received at a receiver. The radio frequency signal is converted into a digital signal including a periodic component with a period. A carrier frequency offset is removed from the digital signal to generate a frequency-shifted digital signal. The frequency-shifted digital signal is filtered to remove a DC offset in the digital signal. The filtering includes applying a moving average filter matched to the period to remove the periodic component from the frequency-shifted digital signal. The moving average filter generates a set of average values based on the frequency-shifted digital signal. The filtering also includes taking a difference between consecutive values of the set of average values to determine the DC offset, where the DC offset is introduced at the receiver.

14 Claims, 8 Drawing Sheets

SYSTEMS AND METHODS FOR DC OFFSET CORRECTION

CROSS-REFERENCE TO RELATED APPLICATIONS

This claims priority to U.S. Provisional Patent Application No. 61/678,530, filed on Aug. 1, 2012, which is incorporated herein by reference in its entirety.

TECHNICAL FIELD

The technology described in this document relates generally to wireless communication systems and more particularly to systems and methods for DC offset correction in a wireless receiver.

BACKGROUND

The wireless transmission of an information signal may include formatting the information signal in a transmitter, modulating the formatted information signal over a baseband carrier, receiving the modulated signal at a receiving device, and demodulating the modulated signal. After demodulation, the received signal may be processed further by the receiving device. Orthogonal frequency division multiplexing (OFDM) is a method of encoding digital data on multiple carrier frequencies for high data rate, high performance wireless communication systems. In an OFDM system, bandwidth is divided into closely spaced orthogonal subcarriers (i.e., tones), which are modulated with data symbols. The transmitted data is divided into parallel data streams, one for each subcarrier. A primary advantage of OFDM over single-carrier schemes is OFDM's ability to operate under unfavorable channel conditions (e.g., attenuation of high frequencies in a long copper wire, narrowband interference, and frequency-selective fading, among others) without complex equalization filters. These advantages simplify equalizer design and have resulted in adoption of OFDM in several standards (e.g., IEEE 802.11a/g/n, IEEE 802.16e, and 3G-LTE). Although data is not typically transmitted on a DC subcarrier in OFDM systems, injection of a DC component may occur at the transmitter and the receiver. The injection of the DC component may limit performance of the communication system.

SUMMARY

The present disclosure is directed to systems and methods for removing DC offset from a signal. In a method for removing DC offset from a signal, a radio frequency signal is received at a receiver. The radio frequency signal is converted into a digital signal including a periodic component with a period. A carrier frequency offset is removed from the digital signal to generate a frequency-shifted digital signal. The frequency-shifted digital signal is filtered to remove a DC offset in the digital signal. The filtering includes applying a moving average filter matched to the period to remove the periodic component from the frequency-shifted digital signal. The moving average filter generates a set of average values based on the frequency-shifted digital signal. The filtering also includes taking a difference between consecutive values of the set of average values to determine the DC offset, where the DC offset is introduced at the receiver.

In another example, a system of removing DC offset from a signal includes a receiver configured to receive a radio frequency signal. The radio frequency signal is converted into a digital signal including a periodic component with a period. The system also includes a carrier frequency offset correction module configured to remove a carrier frequency offset from the digital signal to generate a frequency-shifted digital signal. The system further includes a filter configured to remove a DC offset in the digital signal. The filter includes a moving average filter matched to the period to remove the periodic component from the frequency-shifted digital signal. The moving average filter generates a set of average values based on the frequency-shifted digital signal. The filter also includes a differentiator configured to take a difference between consecutive values of the set of average values to determine the DC offset. The DC offset is introduced at the receiver.

DETAILED DESCRIPTION

Figure 1:
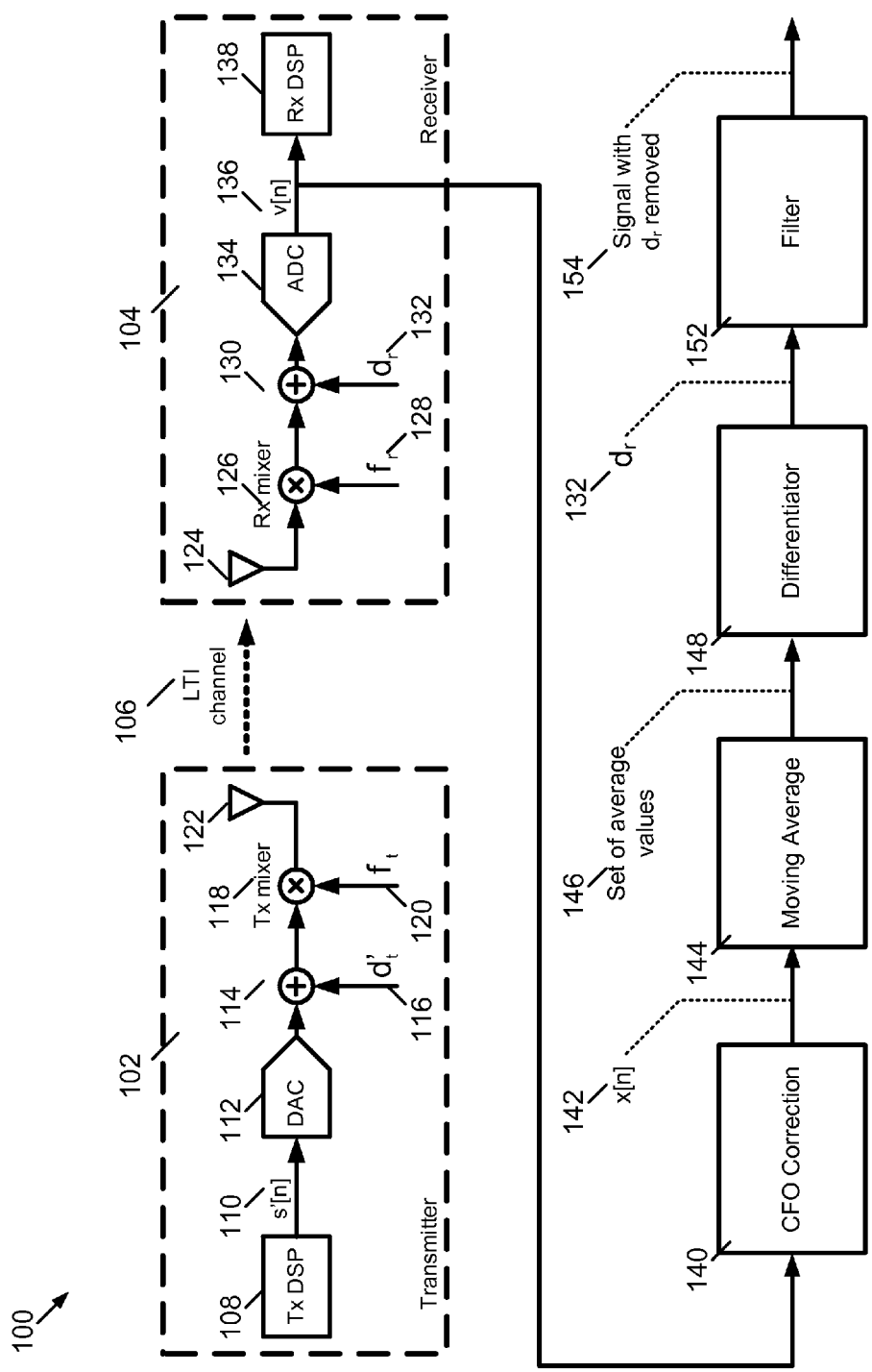
FIG. 1 is a block diagram depicting an example system model for wireless transmission of an information signal.

FIG. 1 is a block diagram depicting an example system model 100 for wireless transmission of an information signal. The system model 100 includes a transmitter 102 and a receiver 104 that communicate over a channel 106. As depicted in FIG. 1, the channel 106 may be a linear time invariant (LTI) channel over which information is transmitted. The transmitter 102 includes a transmitter digital signal processor (DSP) that is used to generate a data packet 110 for transmission to the receiver 104. The data packet 110, labeled s'[n], may be a baseband signal that includes digital data and that is received by a digital to analog converter (DAC) 112. The DAC 112 converts the digital data of the data packet 110 into an analog signal. At adder 114, a complex-valued DC offset $d_t'$ 116 may be introduced into the analog signal. The DC offset $d_t'$ 116 is introduced by circuitry of the transmitter 102 and may cause the analog signal output by the DAC 112 to have a mean amplitude that is not equal to zero. A transmission mixer 118 is used to mix the output of the DAC 112 to a transmission signal at a transmitter carrier frequency $f_t$ 120. A resulting signal is transmitted by an antenna 122 over the channel 106. The transmitted signal may be a radio frequency signal.

At the receiver 104, the transmitted signal is received via an antenna 124. A receiver mixer 126 is used to mix the received signal to a baseband signal at a receiver carrier frequency $f_r$ 128. The transmitter carrier frequency $f_t$ 120 and the receiver carrier frequency $f_r$ 128 deviate from a nominal carrier frequency value, thus resulting in a carrier frequency offset (CFO) that is equal to a difference between the transmitter carrier frequency 120 and the receiver carrier frequency 128 (i.e., $f_t-f_r$). The CFO reflects the fact that the transmitter 102 and the receiver 104 are two different devices, such that the different devices will have carrier frequencies $f_t$ 120 and $f_r$ 128 that differ from the nominal carrier frequency value and from each other. At adder 130, a complex-valued DC offset $d_r$ 132 may be introduced into the output of the receiver mixer 126. The DC offset $d_r$ 132 is introduced by circuitry of the receiver 104 and may be termed "true DC" because the DC offset $d_r$ 132 is at a frequency equal to zero (i.e., it has not been shifted in frequency by the CFO). By contrast, in the signal received by the receiver 104, the transmitter DC offset $d_t'$ 116 is shifted by a frequency equal to the CFO, such that the transmitter DC offset $d_t'$ 116 is not at a frequency equal to zero. The output of the receiver mixer 126 with the DC offset $d_r$ 132 is received by an analog to digital converter (ADC) 134. An output of the ADC 134 is a signal v[n] 136 that is received by a receiver DSP 138. The signal v[n] 136 output from the ADC 134 may be a digital signal including a periodic component with a particular period, as described in further detail below. The system model 100 may utilize a signaling scheme that uses orthogonal frequency division multiplexing (OFDM) or contains portions of a packet preamble that by construction are periodic with zero mean (e.g., Wi-Fi standards 802.11a/g/n/ac, among others).

The signal v[n] 136 is equivalent to the baseband signal transmitted, s'[n] 110, but shifted in frequency by the CFO and modified by the two DIX offset components (i.e., the transmitter DC offset $d_t'$ 116 and the receiver DC offset $d_r$ 132). As noted above, the transmitter DC offset $d_t'$ 116 is also shifted in frequency by the CFO. Thus, the signal v[n] 136 may be expressed as follows:

$$v[n]=d_r+(d_t+s[n])\exp(j\omega_{CFO}n)+z[n] \quad \text{(Equation 1)}$$

In Equation 1 above, s[n] is equivalent to the signal s'[n] 110 modified by a channel response of the channel 106. For an LTI channel, a periodicity of certain segments of the signal s'[n] 110 is preserved in s[n]. In Equation 1, $d_t$ is equivalent to the transmitter DC offset $d_t'$ 116 modified by the channel response. For an LTI channel, $d_t$ is a complex-valued DC signal with magnitude and phase that are potentially different from those of the transmitter DC offset $d_t'$ 116. The term z[n] in Equation 1 represents noise. $\omega_{CFO}$ is the CFO normalized by a sampling frequency $f_s$, according to the following equation:

$$\omega_{CFO}=2\pi(f_t-f_r)/f_s \quad \text{(Equation 2)}$$

In the system model 100 of FIG. 1, it may be desirable to eliminate (i.e., correct) the transmitter DC offset $d_t'$ 116 and the receiver DC offset $d_r$ 132. If left uncorrected, the DC offset may significantly degrade a reception quality and cause a higher data error rate in the system model 100, especially for higher data rates. In order to perform the DC offset correction, modules 140, 144, 148, and 152 of FIG. 1 may be used between the ADC 134 and the receiver DSP 138. When the modules 140, 144, 148, and 152 are used for the DC offset correction, the receiver DSP 138 may not receive the signal v[n] 136 described above in Equation 1. Rather, the receiver DSP 138 receives a signal with the DC offset removed 154 (i.e., the signal v[n] 136 with the transmitter DC offset $d_t'$ 116 and the receiver DC offset $d_r$ 132 removed).

As a first step in performing the DC offset correction, CFO correction is performed at the module 140. As described above, the signal received at the antenna 124 is shifted by the CFO, which is equal to the difference between the transmitter carrier frequency 120 and the receiver carrier frequency 128 (i.e., $f_t-f_r$). A packet structure in the system model 100 may be designed to facilitate accurate CFO estimation. The CFO correction module 140 removes the CFO from the digital signal v[n] 136 to generate a frequency-shifted digital signal x[n] 142.

Following the CFO correction executed at the module 140, the frequency-shifted digital signal x[n] 142 undergoes filtering as part of the DC offset correction. At a module 144, a moving average filter is applied to the frequency-shifted digital signal x[n] 142. The moving average filter is matched to the particular period of the periodic component of the signal v[n] 136. Because the signal x[n] 142 may be equivalent to the signal v[n], but shifted by the CFO, the moving average filter may also be matched to a particular period of a periodic component of the signal x[n] 142. Thus, the moving average filter may utilize an averaging window matched to the particular period of the periodic components of the signals v[n] 136 and x[n] 142. The moving average filter removes the periodic component of the signal x[n] 142 and generates a set of average values 146 based on the frequency-shifted digital signal x[n] 142 (i.e., the moving average filter takes an average every N samples, where the signal x[n] 142 includes the periodic component with a period of N samples).

The set of average values 146 is received by a module 148, which may include a differentiator filter. In the module 148, a difference is taken between consecutive values of the set of average values 146 to eliminate the transmitter DC offset $d_t'$ 116 from the signal x[n] 142 and to determine the receiver DC offset $d_r$ 132. The signal with the receiver DC offset removed 154 is generated as an output of a module 152, which includes a filter or other component configured to remove the determined receiver DC offset $d_r$ 132 from the incoming signal (i.e., an adder or subtractor). The signal with the receiver DC offset removed 154 may be received by the receiver DSP 138.

Figure 2:
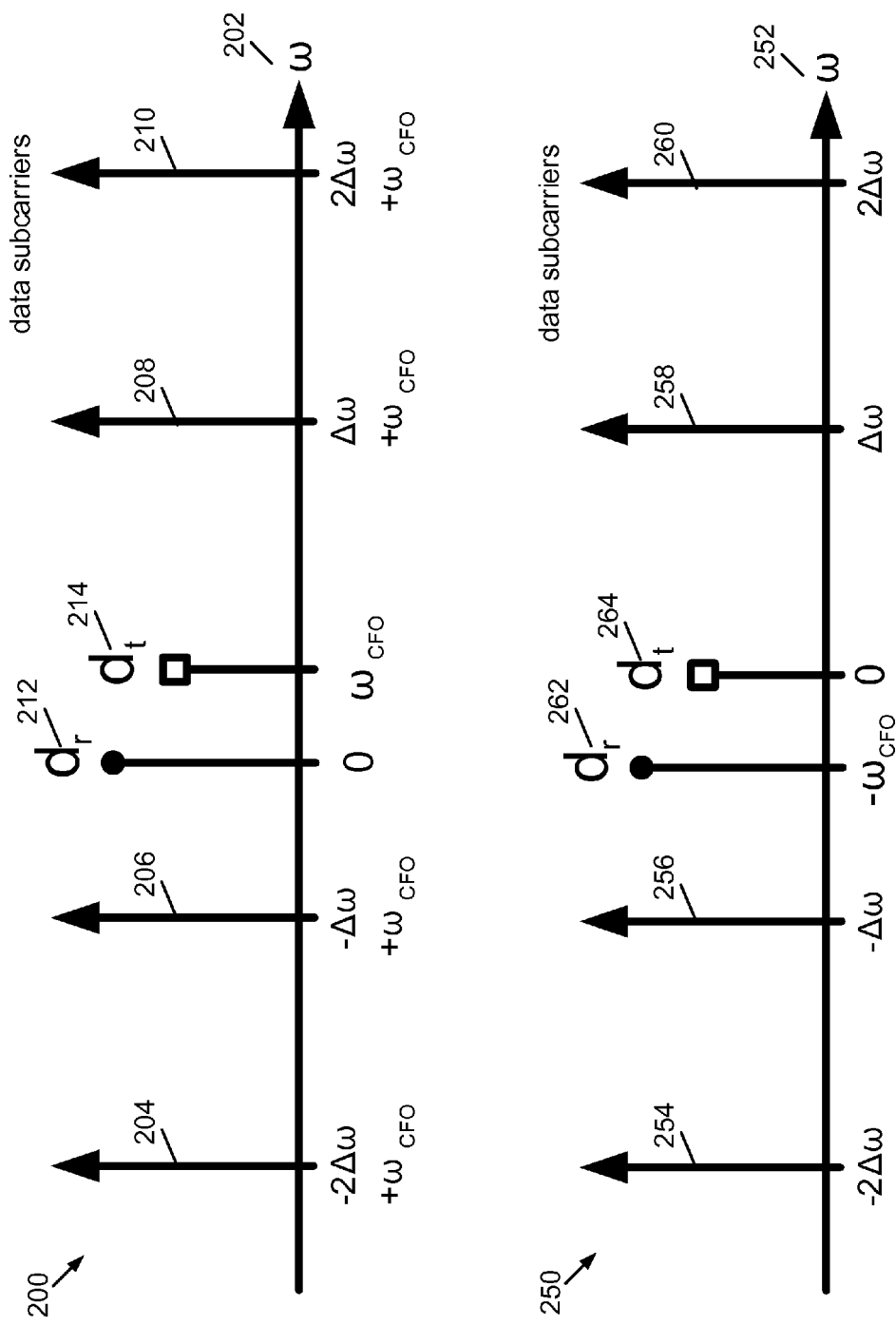
FIG. 2 illustrates example schematic spectrums for signals v[n] and x[n].

FIG. 2 illustrates example schematic spectrums 200, 250 for signals v[n] and x[n], respectively. As described above, CFO correction may be performed as part of a DC offset correction procedure. With reference again to FIG. 1, the signal received at the antenna 124 is shifted by the CFO, where the CFO is equal to the difference between the transmitter carrier frequency 120 and the receiver carrier frequency 128 (i.e., $f_t-f_r$). The CFO correction removes the CFO from the digital signal v[n] to generate a frequency-shifted digital signal x[n]. CFO correction may be executed digitally to generate the frequency-shifted digital signal x[n], which is described by the following equations:

$$x[n]=v[n]\exp(-j\omega_{CFO}n) \quad \text{(Equation 3)}$$

$$x[n]=d_r\exp(-j\omega_{CFO}n)+d_t+s[n]+z[n]\exp(-j\omega_{CFO}n) \quad \text{(Equation 4)}$$

$$z'[n]=z[n]\exp(-j\omega_{CFO}n) \quad \text{(Equation 5)}$$

In the above equations, CFO correction is executed by multiplying the digital signal v[n] by the term $\exp(-j\omega_{CFO}n)$, which shifts the digital signal v[n] in frequency by an amount equal to the CFO in a negative direction. Thus, as illustrated in Equation 4, in the frequency-shifted digital signal x[n], the receiver DC offset $d_r$ is shifted by the CFO away from a zero frequency. By contrast, the transmitter DC offset $d_t$ and the s[n] periodic component are no longer shifted by the CFO (i.e., as they were in the digital signal v[n]) and are now at their correct, original frequencies. In Equation 5, the noise term z[n] is shifted by the CFO, but z[n] and z'[n] have the same statistics if z[n] is white Gaussian noise.

In OFDM systems, data is carried on frequency tones that are equally spaced in frequency (i.e., equally spaced by a subcarrier spacing $\Delta\omega$). Orthogonality between these tones is assured by the fact that the spacing between the tones is the same (i.e., signals at frequencies that are multiples of the subcarrier spacing $\Delta\omega$ are orthogonal). The transmitter DC offset $d_t$ is orthogonal to data subcarriers of the signal v[n], and the orthogonality of the transmitter DC offset $d_t$ continues to hold in the CFO-corrected signal x[n].

The orthogonality of the transmitter DC offset $d_t$ in the signals v[n] and x[n] is illustrated in the example schematic spectrums 200, 250 for signals v[n] and x[n], respectively. In the example schematic spectrum 200 for the signal v[n], an x-axis 202 represents frequency ($\omega$), and data subcarriers 204, 206, 208, 210 are spaced at multiples of the subcarrier spacing $\Delta\omega$, making them orthogonal. The periodic data subcarriers 204, 206, 208, 210 represent a periodic desired signal containing the data intended to be transmitted from the transmitter to the receiver (i.e., signal s[n], which represents the periodic signal s'[n] generated at the transmitter modified by the channel response). The transmitter DC offset $d_t$ 214, positioned at the CFO of $\omega_{CFO}$, is also orthogonal to the data subcarriers 204, 206, 208, 210. The receiver DC offset $d_r$ 212 is at a frequency of zero (i.e., true DC) and is not orthogonal to the data subcarriers 204, 206, 208, 210.

An effect of the CFO correction performed on the signal v[n] is illustrated in the example schematic spectrum 250 for the signal x[n]. As described above, with reference to FIG. 1, the CFO correction performed on the signal v[n] is used to generate the frequency-shifted digital signal x[n]. In the example schematic spectrum 250 for the signal x[n], an x-axis 252 represents frequency ($\omega$), and data subcarriers 254, 256, 258, 260 are orthogonal, being spaced at multiples of the subcarrier spacing $\Delta\omega$. The transmitter DC offset $d_t$ 264, now at a frequency of zero following the CFO correction, continues to be orthogonal to the data subcarriers 254, 256, 258, 260, due to its spacing at a multiple of the subcarrier spacing $\Delta\omega$. After CFO correction, the receiver DC offset $d_r$ 262 shifts to a frequency that is a negative of the CFO, $-\omega_{CFO}$. In the example schematic spectrum 250 for the signal x[n], the transmitter DC offset $d_t$ 264 is at a frequency of zero, a multiple of the subcarrier spacing $\Delta\omega$, and does not affect decoding. By contrast, the receiver DC offset $d_r$ 262 is not orthogonal to the data subcarriers 254, 256, 258, 260. Thus, when the data subcarriers 254, 256, 258, 260 are extracted via a Fourier transform, the extracted data will have a contribution from the receiver DC offset $d_r$ 262, which may cause an error in data decoding.

Figure 3:
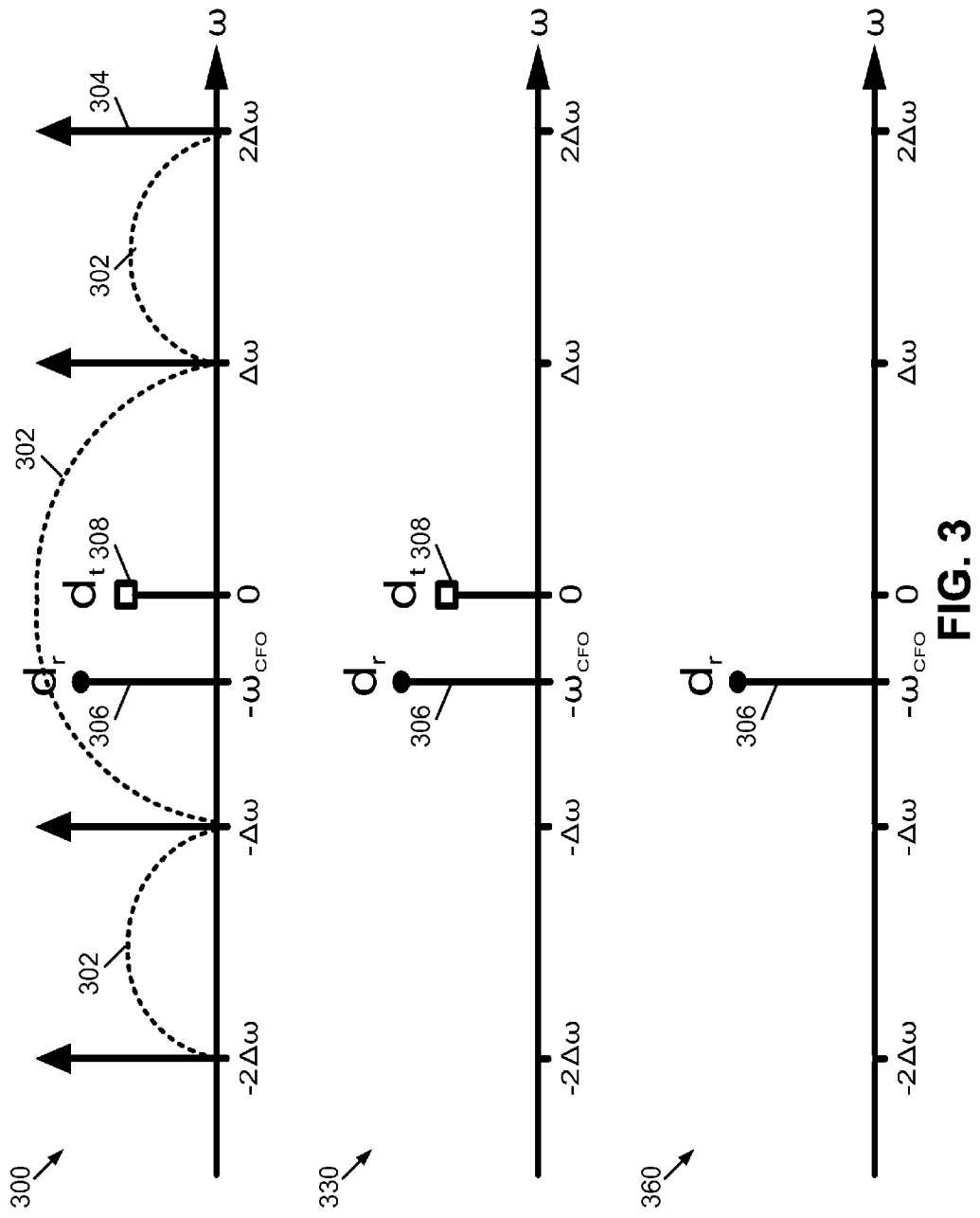
FIG. 3 depicts aspects of an example filtering of a frequency-shifted digital signal to determine a receiver DC offset $d_r$.

FIG. 3 depicts aspects of an example filtering of a frequency-shifted digital signal to determine a receiver DC offset $d_r$ 306. As described above, with reference to FIG. 1, after performing CFO correction on a digital signal v[n], a frequency-shifted digital signal x[n] is generated. The frequency-shifted digital signal x[n] is filtered to determine a transmitter DC offset $d_t$ 308 and the receiver DC offset $d_r$ 306. The filtering may be performed using a moving average filter and a differentiator. At 300, an example schematic spectrum for the frequency-shifted digital signal x[n] is depicted, where the frequency-shifted digital signal x[n] is filtered by a moving average filter. In the example schematic spectrum at 300, a frequency response for the moving average filter is depicted at 302. As in the example schematic spectrum 200 of FIG. 2, periodic data subcarriers 304 represent a periodic desired signal containing data intended to be transmitted from the transmitter to the receiver (i.e., signal s[n], which represents the periodic signal s'[n] generated at the transmitter modified by the channel response). The moving average filter has a period that is equal to the period of the periodic desired signal, and thus, the periodic data subcarriers 304 spaced at multiples of a subcarrier spacing $\Delta\omega$ are filtered out by the moving average filter, as illustrated in an example schematic spectrum at 330. The example schematic spectrum at 330 represents an output of the moving average filter.

Although the periodic data subcarriers 304 (i.e., s'[n], the desired signal to be transmitted that is modified by the channel response) are filtered out by the moving average filter, the transmitter DC offset $d_t$ 308 and the receiver DC offset $d_r$ 306 are not. Thus, the transmitter DC offset $d_t$ 308 and the receiver DC offset $d_r$ 306 appear in the example schematic spectrum at 330, with the transmitter DC offset $d_t$ 308 being at a frequency of zero and the receiver DC offset $d_r$ 306 being at a frequency that is a negative of the CFO, $-\omega_{CFO}$.

The filtering of the signal x[n] by the moving average filter, as depicted at 300 and 330 of FIG. 3, may be described mathematically. For example, the frequency-shifted digital signal x[n] may include a periodic component with a period of N samples, and there may be P consecutive samples available to estimate the DC offset (P>N), starting with a sample at index m (i.e., x[m], . . . x[m+P−1]). By applying the moving average filter to the frequency-shifted digital signal x[n], the periodic component is removed from the frequency-shifted digital signal x[n] and a set of L average values are obtained. The moving average filter averages every N samples. Thus, as a result of the filtering with the moving average filter, L average values are obtained, where L is equal to (P−N+1). Mathematically, the filtering using the moving average filter may be described as follows, where k∈{0, . . . , L−1}, and where $y_{m+k}$ is an output of the moving average filter:

$$y_{m+k} = \frac{1}{N} \sum_{n=m+k}^{N+m+k-1} x[n] = \qquad \text{(Equation 6)}$$

$$\frac{1}{N} \sum_{n=m+k}^{N+m+k-1} (d_r \exp(-j\omega_{CFO}n) + d_i + s[n] + z'[n])$$

$$= d_i + \frac{d_r}{N} \sum_{n=m+k}^{N+m+k-1} \exp(-j\omega_{CFO}n) + \qquad \text{(Equation 7)}$$

$$\frac{1}{N} \sum_{n=m+k}^{N+m+k-1} s[n] + \frac{1}{N} \sum_n z'[n]$$

$$y_{m+k} = d_i + d_r \left( \frac{1}{N} \sum_{n=m+k}^{N+m+k-1} \exp(-j\omega_{CFO}n) \right) + w_{m+k} \qquad \text{(Equation 8)}$$

$$y_{m+k} = d_i + d_r q_{m+k} + w_{m+k} \qquad \text{(Equation 9)}$$

In Equation 7, the periodic desired signal s[n] is cancelled out (i.e., the term $$\frac{1}{N} \sum_{n=m+k}^{N+m+k-1} s[n]$$

is equal to zero), since s[n] is zero-mean periodic with period N. Further, in Equation 7, the noise term z'[n] is filtered, though not removed completely. In Equation 8, the receiver DC offset $d_r$ is shifted by a time-varying phase, where the shift is caused by a CFO correction. Because the CFO is determined in performing the CFO correction, the term by which the receiver DC offset $d_r$ is shifted may be known. With $k \in \{0, \ldots, L-1\}$, the moving average filter generates L average values by producing an average value every N samples.

In Equations 8 and 9, the receiver DC offset $d_r$ and the transmitter DC offset $d_t$ are unknown values, but the $\{q_{m+k}\}$ term can be computed, since the $\{q_{m+k}\}$ term depends on the known CFO and m. In Equation 9, the $w_{m+k}$ term represents filtered noise in the output of the moving average filter. To determine the receiver DC offset $d_r$ and the transmitter DC offset $d_t$, a least-squares formulation can be applied:

$$\begin{bmatrix} y_m \\ y_{m+1} \\ \vdots \\ y_{m+L-1} \end{bmatrix} = \underbrace{\begin{bmatrix} 1 & q_m \\ 1 & q_{m+1} \\ \vdots & \vdots \\ 1 & q_{m+L-1} \end{bmatrix}}_{Q} \begin{bmatrix} d_t \\ d_r \end{bmatrix} + \begin{bmatrix} w_m \\ w_{m+1} \\ \vdots \\ w_{m+L-1} \end{bmatrix} \quad \text{(Equation 10)}$$

A solution to the least-squares formulation is as follows:

$$\begin{bmatrix} \hat{d}_t \\ \hat{d}_r \end{bmatrix} = (Q^H Q)^{-1} Q^H \bar{y} = \quad \text{(Equation 11)}$$

$$\frac{1}{L^2 |q_m|^2 - \left| \sum_{k=0}^{L-1} q_{m+k} \right|^2} \begin{bmatrix} L|q_m|^2 & -\sum_{k=0}^{L-1} q_{m+k} \\ -\sum_{k=0}^{L-1} q_{m+k}^* & L \end{bmatrix} \begin{bmatrix} \sum_{k=0}^{L-1} y_{m+k} \\ \sum_{k=0}^{L-1} q_{m+k}^* y_{m+k} \end{bmatrix}$$

As described above, the transmitter DC offset value $d_t$ 308 is orthogonal to the data subcarriers and does not have an effect in decoding the transmitted signal. An estimate $\hat{d}_r$ for the receiver DC offset $d_r$ 306 may be as follows:

$$\hat{d}_r = A \left[ L \sum_{k=0}^{L-1} q_{m+k}^* y_{m+k} - \left( \sum_{k=0}^{L-1} q_{m+k}^* \right) \left( \sum_{j=0}^{L-1} y_{m+j} \right) \right] = \quad \text{(Equation 12)}$$

$$A \left[ \sum_{k=0}^{L-1} \left( q_{m+k}^* \sum_{j=0}^{L-1} (y_{m+k} - y_{m+j}) \right) \right]$$

$$A = \frac{1}{L^2 |q_m|^2 - \left| \sum_{k=0}^{L-1} q_{m+k} \right|^2} \quad \text{(Equation 13)}$$

The estimate $\hat{d}_r$ for the receiver DC offset $d_r$ 306 is a linear combination of differences for all of the sample pairs (i.e., the L values for the variable y, where the variable y is the output of the moving average filter). Thus, to remove the transmitter DC offset $d_t$ 308 from the output of the moving average filter, a difference between consecutive values of the L values is taken. A result of taking the differences of the consecutive values of the output of the moving average filter is illustrated in the example schematic spectrum at 360 of FIG. 3. The example schematic spectrum at 360 of FIG. 3 may be an output of a differentiator that is configured to take the difference of consecutive samples, where the samples are the L values produced as the output of the moving average filter. By taking the differences of the consecutive samples, a constant component of the moving average filter output is eliminated, where the constant component is the transmitter DC offset $d_t$. Thus, by taking the differences of consecutive samples of the output of the moving average filter, the transmitter DC offset $d_t$ is eliminated, as shown at 360. In the example schematic spectrum at 360, only the receiver DC offset $d_r$ 306 remains at the frequency that is a negative of the CFO, $-\omega_{CFO}$. The receiver DC offset $d_r$ 306 may be scaled by some value in the differentiator operation and may require correction, as described in further detail below.

Figure 4:
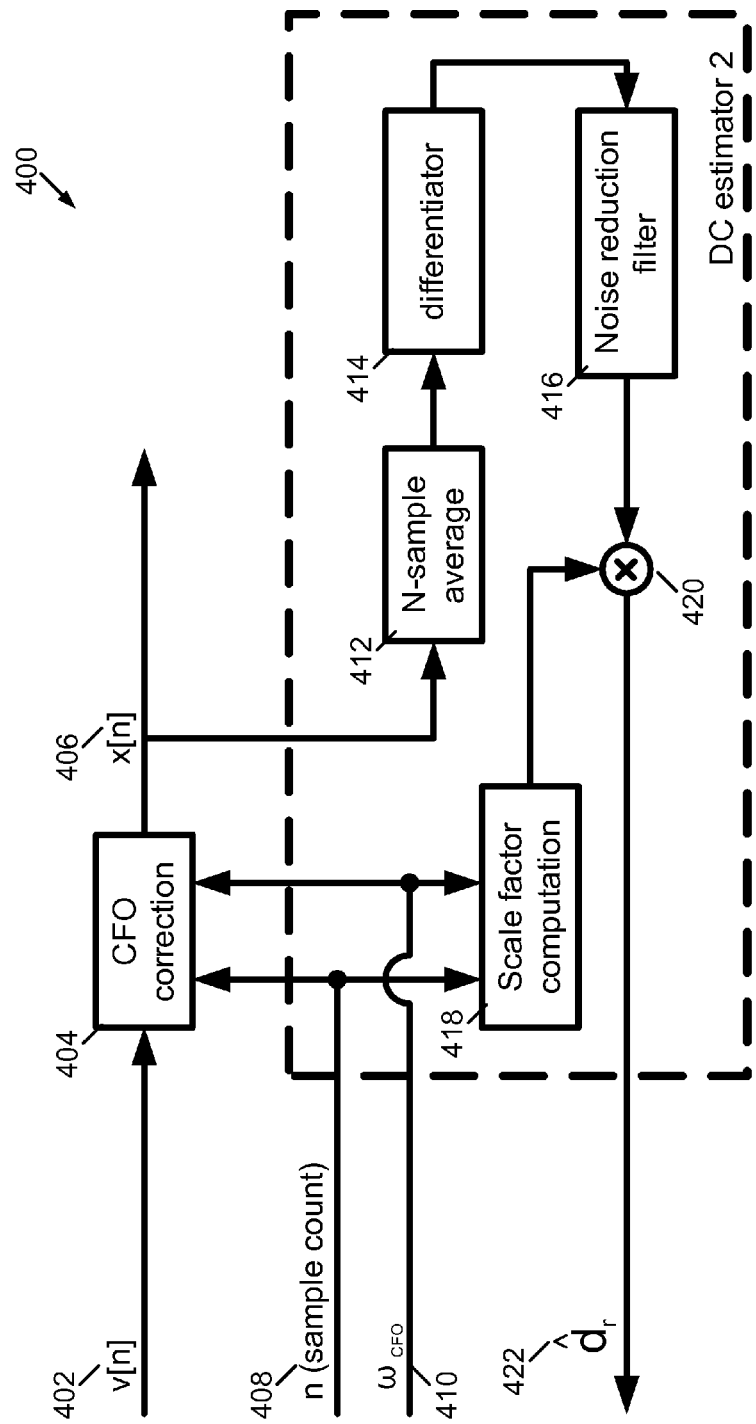
FIG. 4 is a block diagram depicting an example circuit for estimating a receiver DC offset value in a receiver.

FIG. 4 is a block diagram depicting an example circuit 400 for estimating a receiver DC offset value in a receiver. As described above, with reference to FIGS. 1-3, the receiver DC offset value may be estimated by a) performing CFO correction to generate a frequency-shifted digital signal, b) applying a moving average filter to remove a periodic portion of the frequency-shifted digital signal and to produce a set of L average values, and c) taking a difference between consecutive values of the set of L average values to determine the receiver DC offset value. In deriving an equation for the receiver DC offset value, a least-squares formulation is used, where the least-squares formulation indicates that the receiver DC offset value is a combination of consecutive sample differences. The least-squares solution can be viewed as a cascade of three finite impulse response (FIR) filter stages.

An FIR filter representation for performing the receiver DC offset estimation may be implemented via the example circuit 400 of FIG. 4. In FIG. 4, a signal v[n] 402 is received by a CFO correction module 404. The signal v[n] 402 may be a digital signal including a periodic component (e.g., the signal v[n] 136 of FIG. 1, described above). The CFO correction module 404 performs CFO correction on the signal v[n] 402 to generate a frequency-shifted digital signal x[n] 406. The CFO correction may be performed digitally in the CFO correction module 404 by shifting the signal v[n] 402 in frequency by an amount that is a negative of the CFO. To perform the CFO correction on the signal v[n] 402, the CFO correction module 404 receives a sample count n 408 and the CFO value $\omega_{CFO}$ 410. The sample count n 408 may be used to inform the CFO correction module 404 of the periodicity of the signal v[n] 402 (i.e., the number N, where the signal v[n] 402 is periodic with a period N samples). The frequency-shifted digital signal x[n] 406 is received by an N-sample average filter 412, which is configured to remove a desired, periodic portion, s[n], from the signal x[n] 406. As described above, s[n] may be equivalent to a signal s'[n] modified by a channel response of the transmission channel, where the signal s'[n] is a baseband signal generated at the transmitter that includes digital data to be transmitted to the receiver. The N-sample average filter 412 may be a moving average filter that generates an average value every N samples.

An output of the N-sample average filter 412 is received by a differentiator 414. The differentiator 414 is configured to remove a transmitter DC offset $d_t$ from the output of the N-sample average filter 412 by taking a difference of consecutive samples in the output of the N-sample average filter 412. The operation of the differentiator is illustrated in FIG. 3, as described above, in example sample spectrums 330 and 360, which illustrate the removal of the transmitter DC offset $d_t$ 308 using the differentiator. An output of the differentiator 414 is received at a noise reduction filter 416, which calculates a linear combination of the previous filter stages' outputs to reduce noise. Following the N-sample average filter 412 and the differentiator 414, a number of noisy observations of an estimate for the receiver DC offset are available. The noise reduction filter 416 may be used to average the noisy observations to reduce noise. If the noise is white, the noise reduction filter 416 may be an equal-weight average shifted in frequency to have a peak response at a frequency equal to $-\omega_{CFO}$. The noise reduction filter 416 operates to increase a signal to noise ratio for the estimate of the receiver DC offset.

The example circuit 400 of FIG. 4 also includes a scale factor computation module 418 for computing a scaling factor. The scaling factor computed in the scale factor computation module 418 ensures that a combined filter response at the frequency equal to $-\omega_{CFO}$ is equal to 1. In the least-squares solution, this is guaranteed by properties of $q_{m+k}$. In the differentiator 414, an estimate of the receiver DC offset may be scaled down, thus necessitating the scale factor computation module 418. The scale factor computation module 418 receives the sample count n 408 and the CFO $\omega_{CFO}$ 410. A mixer 420 is used to apply an output of the scale factor computation module 418 to the output of the noise reduction filter 416 to produce a scaled estimate for the receiver DC offset $\hat{d}_r$ 422. The scaled estimate for the receiver DC offset $\hat{d}_r$ 422 is an output of the circuit 400.

Figure 5:
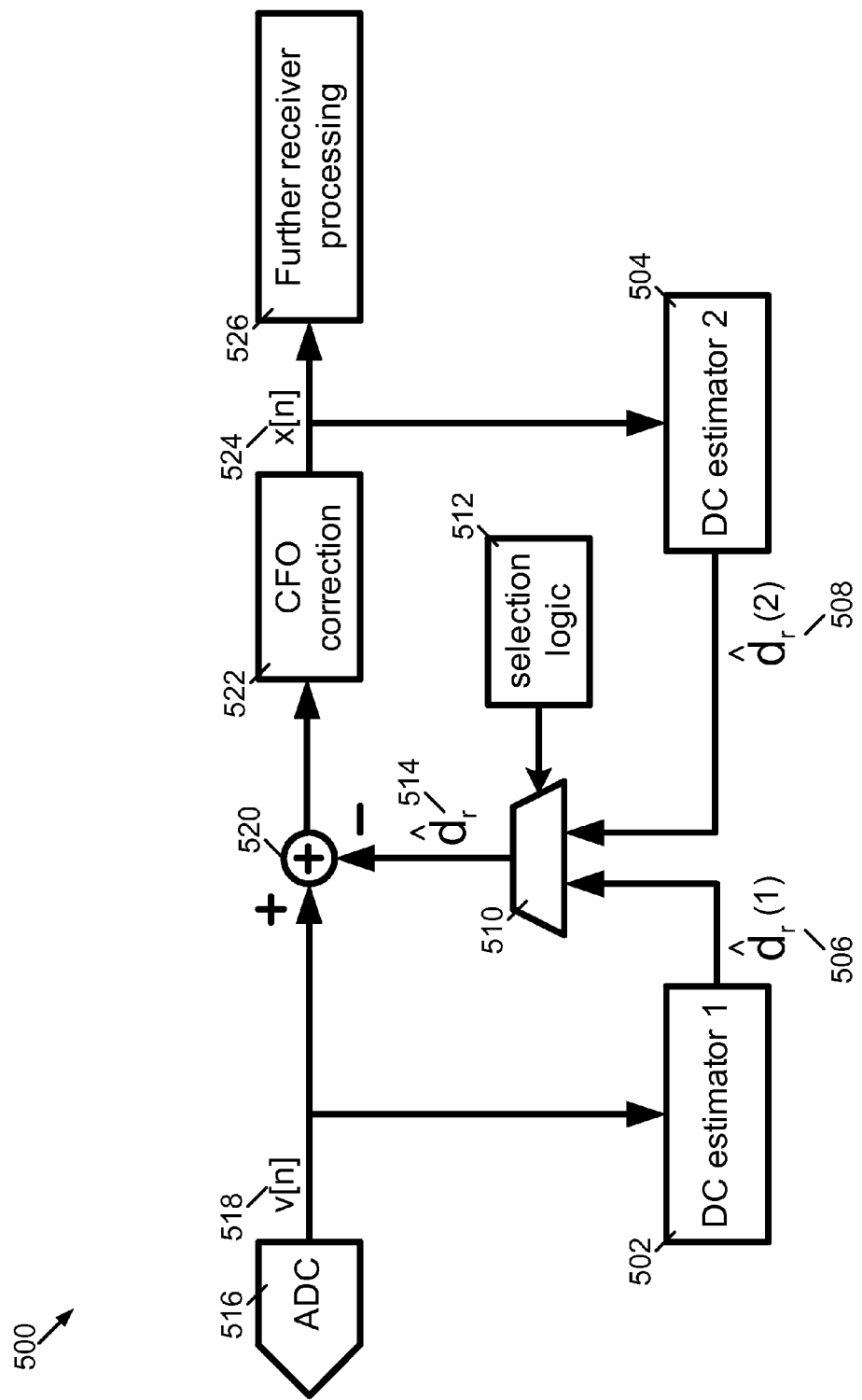
FIG. 5 is a block diagram depicting an example circuit for removing a receiver DC offset, where the example circuit computes two estimates for the receiver DC offset, $\hat{d}_r(1)$ and $\hat{d}_r(2)$, and a multiplexer selects one of the two estimates to be removed.

FIG. 5 is a block diagram depicting an example circuit 500 for removing a receiver DC offset, where the example circuit 500 computes two estimates for the receiver DC offset, $\hat{d}_r(1)$ 506 and $\hat{d}_r(2)$ 508, and a multiplexer 510 selects one of the two estimates to be removed. In the example circuit 500 of FIG. 5, an ADC 516 is part of a receiver (e.g., the receiver 104 of FIG. 1) and is used to produce a signal v[n] 518. The signal v[n] 518 is a digital signal including a periodic signal with a particular period. The signal v[n] 518 is received at a CFO correction module 522, which is configured to produce a frequency-shifted digital signal x[n] 524.

The example circuit 500 is configured to produce two estimates for the receiver DC offset, $\hat{d}_r(1)$ 506 and $\hat{d}_r(2)$ 508, where the estimates 506, 508 are generated by a DC estimator 1 module 502 and a DC estimator 2 module 504. With reference to FIG. 4, the DC estimator 2 module 504 may be implemented by the example circuit 400. As described above, the example circuit 400 uses an output x[n] of a CFO correction module to determine an estimate of the receiver DC offset, where the estimate is produced by applying a moving average filter and taking a difference between consecutive samples of the output of the moving average filter. Thus, in the example circuit 500 of FIG. 5, the DC estimator 2 504 receives the frequency-shifted digital signal x[n] 524 and uses the frequency-shifted digital signal x[n] 524 to produce the second receiver DC offset estimate $\hat{d}_r(2)$ 508.

The DC estimator 1 502 of FIG. 5, by contrast, uses the ADC output signal v[n] 518 to produce the first receiver DC offset estimate $\hat{d}_r(1)$ 506 and does not use the CFO-corrected signal x[n] 524. The DC estimator 1 502 may include a moving average filter, with an averaging window matched to a period of the received signal, and a second filter in cascade to reduce remaining noise. Thus, in the example circuit 500 of FIG. 5, the DC estimator 1 502 receives the v[n] signal 518 output from the ADC 516 and uses the v[n] signal 518 to produce the first receiver DC offset estimate $\hat{d}_r(1)$ 506. The DC estimator 1 502 could be implemented via the DC estimator of commonly owned U.S. Pat. No. 8,218,686, which is incorporated herein by reference in its entirety.

The first and second receiver DC offset estimates $\hat{d}_r(1)$ 506 and $\hat{d}_r(2)$ 508 are received by the multiplexer 510. The multiplexer 510 uses selection logic 512 to choose one of the two estimates 506, 508 to be output as a selected, final estimate $\hat{d}_r$ 514. The use of the selection logic 512 reflects the fact that in some cases, the output 506 of the DC estimator 1 may be more accurate, and in other cases, the output 508 of the DC estimator 2 may be more accurate. The selected, final estimate $\hat{d}_r$ 514 may be subtracted from the v[n] signal 518 at an adder 520. The v[n] signal 518, now with the estimated receiver DC offset $\hat{d}_r$ 514 removed, may be received by the CFO correction module 522, where the x[n] output 524 of the CFO correction module 522 undergoes further receiver processing (e.g., in a receiver DSP) at 526.

To evaluate the performance of the DC estimator 1 502 and the DC estimator 2 504, an estimate error may be determined, where the estimate error is given by:

$$err = \hat{d}_r - d_r, \quad \text{(Equation 14)}$$

where err is the estimate error in an estimated receiver DC offset, $\hat{d}_r$ is the estimated receiver DC offset (e.g., either of the first or the second receiver DC offset estimates $\hat{d}_r(1)$ 506 and $\hat{d}_r(2)$ 508), and $d_r$ is an actual receiver DC offset. Equivalently, Equation 14 may describe a residual receiver DC offset after estimation and compensation (e.g., a portion of the actual receiver DC offset that is not removed by the example circuit 500 for removing the receiver DC offset). The estimation error may be quantified by its root mean squared (RMS) value, according to the following equation:

$$\sigma_{err} = \sqrt{E[|err|^2]} \quad \text{(Equation 15)}$$

To capture an impact of the estimation error on OFDM signal reception, a level of interference that the residual receiver DC offset creates to data subcarriers may be expressed via the following equation:

$$P_{int} = 10 \log_{10}\left(\max_k\left\{\left|\sum_{n=0}^{N_{DFT}-1} \sigma_{err} \exp(-j\omega_{CFO}n)\exp\left(\frac{-j2\pi nk}{N_{DFT}}\right)\right|^2\right\}\right), \quad \text{(Equation 16)}$$

$$k \in \{0, \ldots, N_{DFT}-1\},$$

where $P_{int}$ represents the level of interference and $N_{DFT}$ is a total number of subcarriers in an OFDM symbol. In judging the performance of the DC estimator 1 502 and the DC estimator 2 504, the $P_{int}$ metric may be computed and evaluated.

In an example, the DC estimator 1 502 and the DC estimator 2 504 may be compared via a simulation or experimentally. A frequency-shifted digital signal x[n] may include a periodic component with a period of N samples, and there may be P consecutive samples available to estimate the DC offset (P>N), starting with a sample at index m (i.e., x[m], . . . x[m+P−1]). Simulation or experimental parameters may include packet parameters compliant with 802.11g, for example (e.g., $N_{DFT}$=64; preamble periodicity N=16 samples; sampling frequency $f_s$=20 MHz). The number of consecutive samples P may be equal to 24 (i.e., 1.5 periods), and both estimation methods may use a same number of P consecutive samples. A magnitude of a transmitter DC offset $d_t$ may be given with respect to the power of s[n]. In the simulation or experiment a signal to noise (SNR) value represents a ratio between the periodic, desired signal s[n] and noise z[n].

Figure 6:
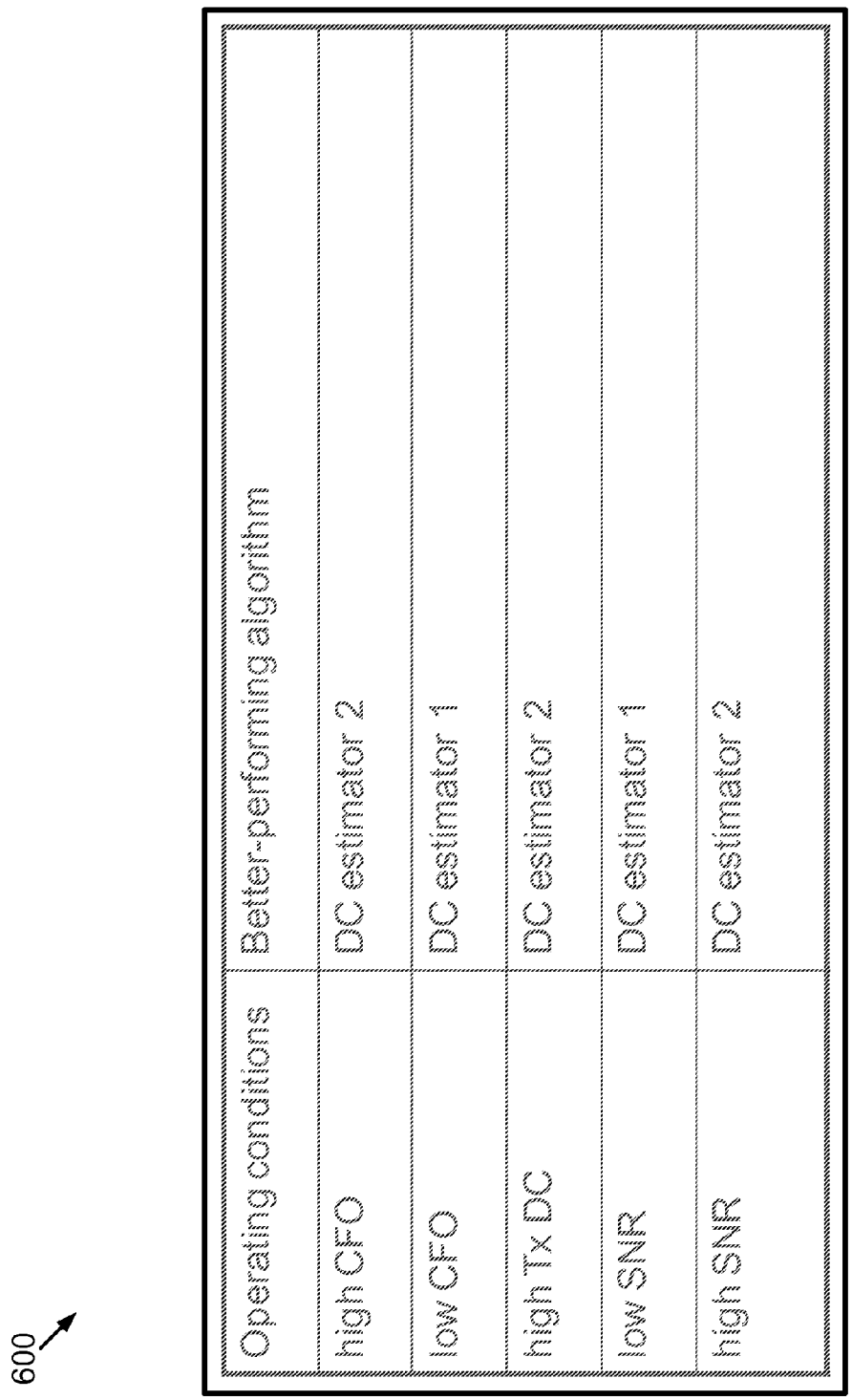
FIG. 6 is a table including results that compare performance of a DC estimator 1 and a DC estimator 2.

FIG. 6 is a table 600 including results that compare performance of a DC estimator 1 and a DC estimator 2. The DC estimator 1 may be the DC estimator 1 502 of FIG. 5, where the DC estimator 1 502 is configured to apply a moving average filter to the digital signal v[n] 518 to generate the first receiver DC offset estimate $\hat{d}_r(1)$ 506. The DC estimator 2 may be the DC estimator 2 504 of FIG. 5, where the DC estimator 2 504 is configured to filter the frequency-shifted digital signal x[n] 524 to generate the second receiver DC offset estimate $\hat{d}_r(2)$ 508. The DC estimator 2 may also be equivalent to the example circuit 400 of FIG. 4. In the table 600 of FIG. 6, the presented results may be generated as a result of the simulation or experimental process described above (e.g., with $N_{DFT}=64$; preamble periodicity N=16 samples; sampling frequency $f_s=20$ MHz; available samples P=24).

As illustrated in the table 600, by varying CFO, SNR, and transmitter DC offset variables, a better performing algorithm (i.e., DC estimator 1 versus DC estimator 2) may also vary. At high CFO values, the DC estimator 2 may generate an estimate for the receiver DC offset $d_r$ with a higher accuracy, as versus an estimate generated by the DC estimator 1. By contrast, at low CFO values, the DC estimator 1 may generate an estimate for the receiver DC offset $d_r$ with a higher accuracy, as versus an estimate generated by the DC estimator 2. The DC estimator 2 may perform better at high CFO values because the DC estimator 2 operates on the frequency-shifted digital signal x[n], which has already had the CFO removed from the signal, whereas the DC estimator 1 operates on the digital signal v[n], which still includes the CFO.

At a low SNR, the DC estimator 1 may be more accurate, and at a high SNR, the DC estimator 2 may be more accurate. The table 600 also illustrates that if a transmitter DC offset is high, the DC estimator 2 may perform more accurately than the DC estimator 1. The DC estimator 2 may perform more accurately at high transmitter DC offset values because the DC estimator 2 is configured to take a difference between consecutive samples of the output of the moving average filter to remove the transmitter DC offset (e.g., using a differentiator module).

In selecting an output from one of the DC estimator 1 and the DC estimator 2, simulation data may be plotted as a graph, such that data from the graphs can be read and used in making the selection. For example, interference level (dB) versus CFO (kHz) may be plotted for a transmitter DC offset of −20 dB, where the interference level is plotted for various SNR values (e.g., 25 dB to 40 dB). The interference level is the residual receiver DC offset (e.g., a portion of the actual receiver DC offset that is not removed by the example circuit 500 for removing the receiver DC offset). In another example, the interference level (dB) versus CFO (kHz) may be plotted for a SNR of 30 dB, where the interference level is plotted for various values of transmitter DC offset.

Using simulation data or experimental data, a better performing receiver DC offset estimator can be selected based on one or more of a) CFO value, b) SNR, and c) transmitter DC offset. The CFO value may be accurately estimated. As noted above, the DC estimator 2 requires CFO to be estimated, whereas the DC estimator 1 does not. An approximate value for the SNR may be available in most cases. The transmitter DC offset may be unknown, but a range for the transmitter DC offset may be known. In one example, the selection logic for selecting the DC estimator 1 or the DC estimator 2 (e.g., selection logic 512 of FIG. 5) may use a threshold on the absolute value of the CFO, above which the DC estimator 2 is used, where the DC estimator 1 is used otherwise. The threshold may be selected from a table or graph based on SNR and transmitter DC offset values.

Figure 7:
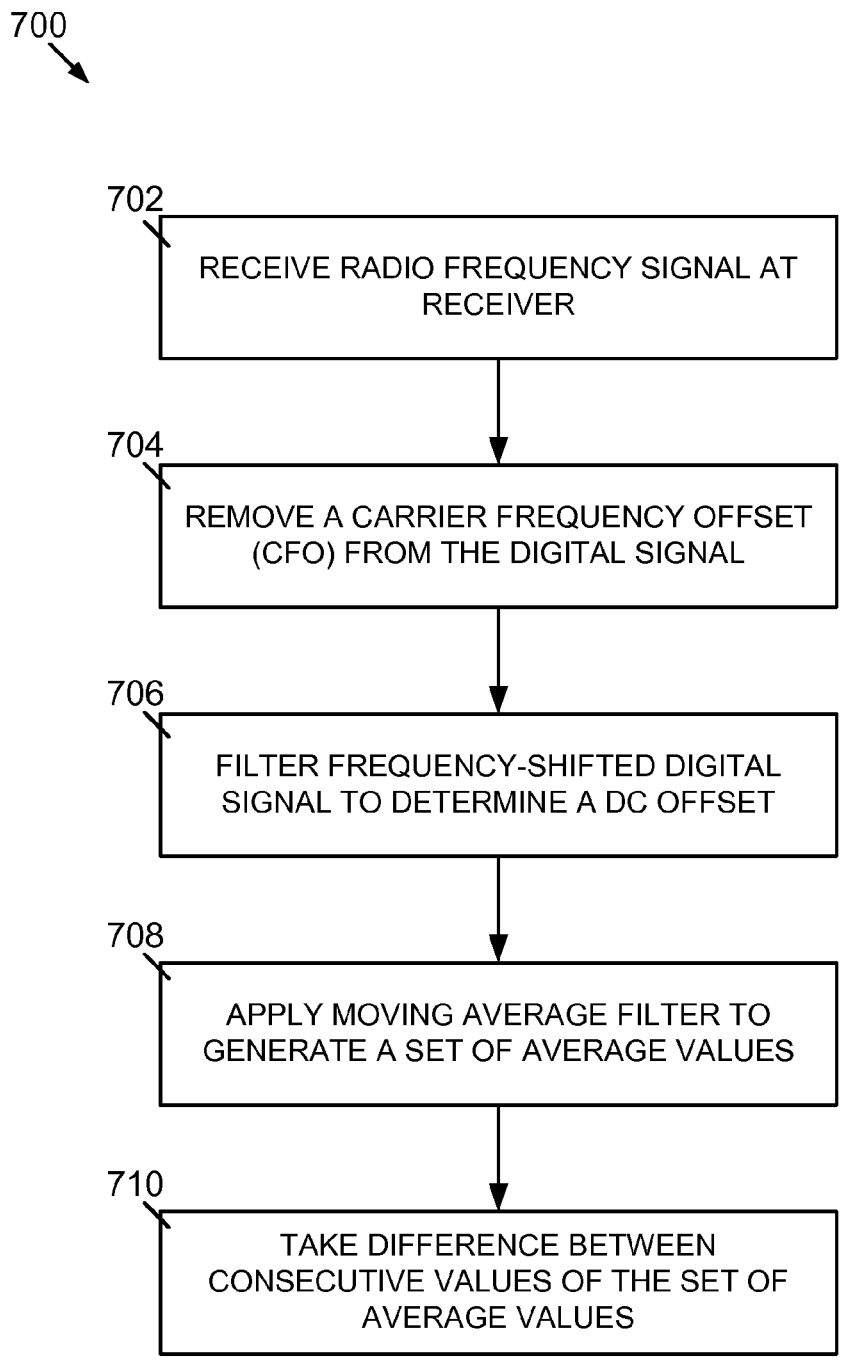
FIG. 7 is a flowchart illustrating an example method for removing DC offset from a signal.

FIG. 7 is a flowchart 700 illustrating an example method for removing DC offset from a signal. At 702, a radio frequency signal is received at a receiver, where the radio frequency signal is converted into a digital signal including a periodic component with a period. At 704, a carrier frequency offset is removed from the digital signal to generate a frequency-shifted digital signal. At 706, the frequency-shifted digital signal is filtered to determine a DC offset in the digital signal. The filtering includes, at 708, applying a moving average filter matched to the period to remove the periodic component from the frequency-shifted digital signal. The moving average filter generates a set of average values based on the frequency-shifted digital signal. The filtering also includes, at 710, taking a difference between consecutive values of the set of average values to determine the DC offset, where the DC offset is introduced at the receiver.

Figure 8:
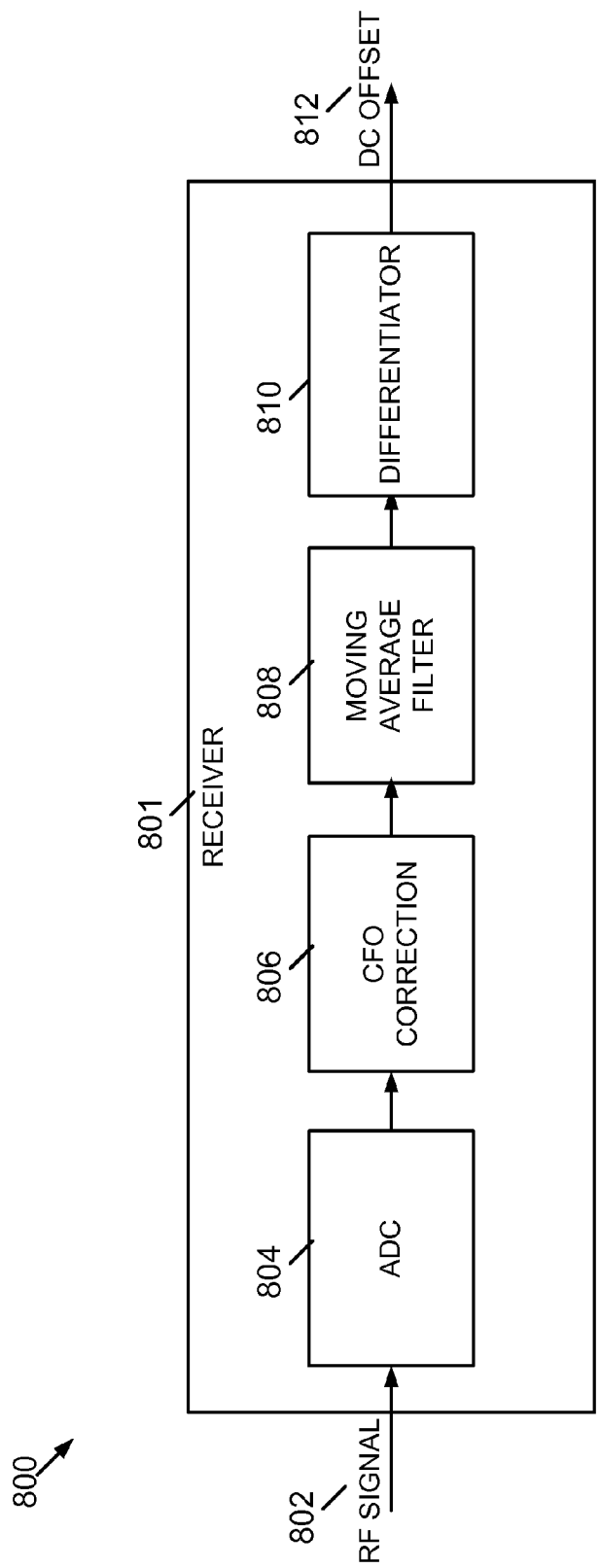
FIG. 8 is a block diagram depicting an example system for removing DC offset from a signal.

FIG. 8 is a block diagram depicting an example system 800 for removing DC offset from a signal. The system 800 includes a receiver 801, where the receiver 801 is configured to receive a radio frequency signal 802. In an ADC 804, the radio frequency signal is converted into a digital signal including a periodic component with a period. The system 800 further includes a carrier frequency offset correction module 806 that is configured to remove a carrier frequency offset from the digital signal to generate a frequency-shifted digital signal. The system 800 is configured to determine a DC offset in the digital signal and includes a moving average filter 808. The moving average filter 808 is matched to the period to remove the periodic component from the frequency-shifted digital signal, and the moving average filter 808 generates a set of average values based on the frequency-shifted digital signal. The system 800 further includes a differentiator 810 configured to take a difference between consecutive values of the set of average values to determine the DC offset, where the DC offset is introduced at the receiver.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method of removing DC offset from a signal, the method comprising:
   receiving a radio frequency signal at a receiver, the radio frequency signal being converted into a digital signal including a periodic component in a frequency domain, the periodic component having a period;
   removing a carrier frequency offset (CFO) from the digital signal to generate a frequency-shifted digital signal; and
   filtering the frequency-shifted digital signal to determine a first DC offset in the digital signal, the first DC offset being a first estimate for an actual DC offset introduced at the receiver, the filtering including:
   (i) applying a first moving average filter to the frequency-shifted digital signal, the first moving average filter being matched to the period in the frequency domain to remove the periodic component from the frequency-shifted digital signal, and the first moving average filter generating a set of average values based on the frequency-shifted digital signal, wherein each average value has an averaging window equal in size to the period, and wherein the averaging windows of each pair of neighboring average values overlap each other, and
   (ii) taking a difference between consecutive values of the set of average values to determine the first DC offset; and
   applying a second moving average filter to the digital signal to determine a second DC offset, the second DC offset being a second estimate for the actual DC offset introduced at the receiver;
   selecting either the first DC offset or the second DC offset, wherein the selecting is based on at least one of a CFO value, signal-to-noise ratio (SNR), and transmitter DC offset; and
   removing the selected offset from the digital signal;
   wherein the taking of the difference between the consecutive values is via a differentiator to produce an output value of the differentiator;
   wherein the method further includes applying a noise reduction filter to the output value to determine the first DC offset; and
   wherein the taking of the difference between the consecutive values of the set of average values includes removing a DC offset introduced at a transmitter from the frequency-shifted digital signal.

2. The method of claim 1, wherein the selecting is executed based on the carrier frequency offset or a signal to noise ratio of the radio frequency signal.

3. The method of claim 1, further comprising:
   applying the noise reduction filter to the output value, wherein the noise reduction filter is an equal-weight average filter with a peak response at a frequency equal to the carrier frequency offset.

4. The method of claim 1, further comprising:
   receiving the radio frequency signal at the receiver, wherein the radio frequency signal includes an information packet having a preamble, and wherein the preamble is periodic in a time domain with zero-mean.

5. The method of claim 1, further comprising:
   applying the first moving average filter to generate the set of average values, wherein the frequency-shifted digital signal is periodic with a period of N samples, wherein there are P consecutive samples of the frequency-shifted digital signal available starting with a sample at an index m, wherein P is greater than N, wherein the set of average values includes L average values, and wherein the set of average values is described by an equation:

$$y_{m+k} = d_t + d_r q_{m+k} + w_{m+k},$$

where $k \in \{0, \ldots, L-1\}$, $d_t$ is the DC offset introduced at the transmitter that is modified by a transmission channel, $d_r$ is the actual DC offset introduced at the receiver, $q_{m+k}$ is a term configured to shift the $d_r$ term by a time-varying phase, $w_{m+k}$ is a noise term, $y_{m+k}$ is the set of average values, and wherein L is described by a second equation:

$$L = P - N + 1.$$

6. The method of claim 1, further comprising:
   removing the carrier frequency offset from the digital signal to generate the frequency-shifted digital signal, wherein the digital signal is described by a first equation:

$$v[n] = d_r + (d_t + s[n]) \exp(j\omega_{CFO} n) + z[n],$$

where $v[n]$ is the digital signal, $d_r$ is the actual DC offset introduced at the receiver, $d_t$ is the DC offset introduced at the transmitter that is modified by a transmission channel, $s[n]$ is a data packet generated at the transmitter that is modified by the transmission channel, $\omega_{CFO}$ is a Frequency equal to the carrier frequency offset normalized by a sampling frequency, $z[n]$ is a noise term, and wherein the frequency-shifted digital signal is described by a second equation:

$$x[n] = v[n] \exp(-j\omega_{CFO} n),$$

where $x[n]$ is the frequency-shifted digital signal.

7. The method of claim 1, wherein the method further comprises:
   taking the difference between the consecutive values via a differentiator to produce an output value of the differentiator, to remove a DC offset introduced at a transmitter from the frequency-shifted digital signal, and
   applying a noise reduction filter to the output value to determine the first DC offset; and
   wherein the digital signal is described by a first equation:

$$v[n] = d_r + (d_t + s[n]) \exp(j\omega_{CFO} n) + z[n],$$

where $v[n]$ is the digital signal, $d_r$ is the actual DC offset introduced at the receiver, $d_t$ is the DC offset introduced at the transmitter that is modified by a transmission channel, $s[n]$ is a data packet generated at the transmitter that is modified by the transmission channel, $\omega_{CFO}$ is a frequency equal to the carrier frequency offset normalized by a sampling frequency, $z[n]$ is a noise term, and wherein the frequency-shifted digital signal is described by a second equation:

$$x[n] = v[n] \exp(-j\omega_{CFO} n),$$

where $x[n]$ is the frequency-shifted digital signal.

8. The method of claim 4, further comprising:
receiving the radio frequency signal at the receiver, wherein the information packet is in conformance with one or more of 802.11a, 802.11g, 802.11n, or 802.11ac standards.

9. A system of removing DC offset from a signal, the system comprising:
a receiver configured to receive a radio frequency signal, the radio frequency signal being converted into a digital signal including a periodic component in a frequency domain, the periodic component having a period;
a carrier frequency offset correction module configured to remove a carrier frequency offset (CFO) from the digital signal to generate a frequency-shifted digital signal; and
a filter configured to determine a first DC offset in the digital signal, the first DC offset being a first estimate for an actual DC offset introduced at the receiver, the filter including
(i) a first moving average filter applied to the frequency-shifted digital signal, the first moving average filter being matched to the period in the frequency domain to remove the periodic component from the frequency-shifted digital signal, and the first moving average filter generating a set of average values based on the frequency-shifted digital signal, wherein each average value has an averaging window equal in size to the period, and wherein the averaging windows of each pair of neighboring average values overlap each other, and
(ii) a differentiator configured to take a difference between consecutive values of the set of average values to determine the first DC offset; and
a second moving average filter that is applied to the digital signal to determine a second DC offset, the second DC offset being a second estimate for the actual DC offset introduced at the receiver, wherein either the first DC offset or the second DC offset is selected based on at least one of a CFO value, signal-to-noise ratio (SNR), and transmitter DC offset, and wherein the selected offset is removed from the digital signal;
wherein the differentiator is configured to take the difference between the consecutive values to produce an output value, and wherein a noise reduction filter is applied to the output value to determine the first DC offset; and
wherein the differentiator is configured to take the difference between the consecutive values of the set of average values to remove a DC offset introduced at a transmitter from the frequency-shifted digital signal.

10. The system of claim 9, wherein the selecting is executed based on the carrier frequency offset or a signal to noise ratio of the radio frequency signal.

11. The system of claim 9, wherein the noise reduction filter is an equal-weight average filter with a peak response at a frequency equal to the carrier frequency offset.

12. The system of claim 9, wherein the frequency-shifted digital signal is periodic with a period of N samples, wherein there are P consecutive samples of the frequency-shifted digital signal available starting with a sample at an index m, wherein P is greater than N, wherein the set of average values includes L average values, and wherein the set of average values is described by an equation:

$$y_{m+k}=d_t+d_r q_{m+k}+w_{m+k},$$

where $k \in \{0, \ldots, L-1\}$, $d_t$ is the DC offset introduced at the transmitter that is modified by a transmission channel, $d_r$ is the actual DC offset introduced at the receiver, $q_{m+k}$ is a term configured to shift the $d_r$ term by a time-varying phase, $w_{m+k}$ is a noise term, $y_{m+k}$ is the set of average values, and wherein L is described by a second equation:

$$L=P-N+1.$$

13. The system of claim 9, wherein:
the carrier frequency offset correction module is configured to remove the carrier frequency offset from the digital signal to generate a frequency-shifted digital signal, wherein the digital signal is described by a first equation:

$$v[n]=d_r+(d_t+s[n])\exp(j\omega_{CFO}n)+z[n],$$

where $v[n]$ is the digital signal, $d_r$ is the actual DC offset introduced at the receiver, $d_t$ is the DC offset introduced at the transmitter that is modified by a transmission channel, $s[n]$ is a data packet generated at the transmitter that is modified by the transmission channel, $\omega_{CFO}$ is a frequency equal to the carrier frequency offset normalized by a sampling frequency, $z[n]$ is a noise term, and wherein the frequency-shifted digital signal is described by a second equation:

$$x[n]=v[n]\exp(-j\omega_{CFO}n),$$

where $x[n]$ is the frequency-shifted digital signal.

14. The system of claim 9, wherein the differentiator takes the difference between the consecutive values to produce an output value, to remove a DC offset introduced at a transmitter from the frequency-shifted digital signal, and wherein a noise reduction filter is applied to the output value to determine the first DC offset; and
wherein the digital signal is described by a first equation:

$$v[n]=d_r+(d_t+s[n])\exp(j\omega_{CFO}n)+z[n],$$

where $v[n]$ is the digital signal, $d_r$ is the actual DC offset introduced at the receiver, $d_t$ is the DC offset introduced at the transmitter that is modified by a transmission channel, $s[n]$ is a data packet generated at the transmitter that is modified by the transmission channel, $\omega_{CFO}$ is a frequency equal to the carrier frequency offset normalized by a sampling frequency, $z[n]$ is a noise term, and wherein the frequency-shifted digital signal is described by a second equation:

$$x[n]=v[n]\exp(-j\cdot\omega_{CFO}n),$$

where $x[n]$ is the frequency-shifted digital signal.

* * * * *